United States Patent [19]

Cordua

[11] 4,402,829

[45] Sep. 6, 1983

[54] DISC-TYPE FILTER

[75] Inventor: Paul M. Cordua, Lindsay, Calif.

[73] Assignee: R & G Sloane Manufacturing Company, Inc., Sun Valley, Calif.

[21] Appl. No.: 336,960

[22] Filed: Jan. 4, 1982

[51] Int. Cl.³ ............................................ B01D 25/18
[52] U.S. Cl. ................................ 210/333.01; 210/411; 210/488
[58] Field of Search .............. 210/237, 238, 331, 332, 210/333.1, 333.01, 345, 347, 411, 488

[56] References Cited

U.S. PATENT DOCUMENTS

| | | | |
|---|---|---|---|
| 1,906,391 | 5/1933 | McKinley | 210/411 |
| 2,583,423 | 1/1952 | Hallinan | 210/185 |
| 3,006,478 | 10/1961 | Mueller | 210/356 |
| 3,037,633 | 6/1962 | Veitel et al. | 210/232 |
| 3,152,988 | 10/1964 | Gutkowski et al. | 210/485 |
| 3,285,420 | 11/1966 | Muller | 210/262 |
| 3,387,712 | 6/1968 | Schaink | 210/411 X |
| 3,528,554 | 4/1970 | Ogden et al. | 210/343 |
| 3,622,003 | 11/1971 | Czech | 210/411 X |
| 4,123,356 | 10/1978 | Sugimoto et al. | 210/427 |

Primary Examiner—John Adee
Attorney, Agent, or Firm—Fulwider, Patton, Rieber, Lee & Utecht

[57] ABSTRACT

A disc-type filter, having a filter housing and contained therein a stack of slightly spaced apart axially moveable annular filter plates slidably interconnected to each immediate adjacent plate by three symmetrically and uniformly placed two-headed rivets which provide a predetermined and uniform spacing between the plates when the plates are moved apart for cleaning by reverse flushing. An actuation rod allows selective enlargement of the spaces between the plates, and holds the plates in their spaced apart cleaning position. The stack of plates is held in axial alignment immediately over an input port by guide bars which slidable engage the periphery of the plates. The plates and filter are constructed to permit use of one plate in any position in the stack, and the plates have an annular flange to divert fluid flow to improve cleaning and provide a pre-filtering for larger particulate matter.

41 Claims, 12 Drawing Figures

DISC-TYPE FILTER

BACKGROUND OF THE INVENTION

The present invention relates generally to filters for use in the filtration of fluids and, more particularly, to a disc-type filter.

Conventional disc-type filters generally include an elongated housing and stacked therein a number of slightly spaced apart discs or filter plates. The stack of plates is positioned in the path of fluid flow between two flow ports in the housing, and each plate typically has at least one central opening, with the individual plate openings in communication with one another and with one of the flow ports of the housing. The fluid being filtered flows between the two ports and passes through the spaces between the plates which provide filter action by trapping particulate matter in the fluid.

As the spaces between the plates become clogged, the flow of fluid through the filter is inhibited and it becomes necessary to clean the filter by reversing the flow of fluid and flushing the trapped matter free of the plates. To facilitate cleaning, some filters have plates which are held together during filtration by a releasable compressive force, with the plates permitted to separate to increase the spacing between the plates during cleaning. The increased spacing allows the fluid to more easily and completely free matter tightly lodged between the plates during filtration. A disc-type filter of this general construction is shown in U.S. Pat. No. 4,123,356, and includes a support tube on which the plates are stacked and by which the stacked plates are held in alignment.

A significant disadvantage of filters of this type is in their inability to provide a uniform and predetermined spacing between the plates when the compressive force is removed and reverse flushing occurs. If adjacent plates do not separate sufficiently the cleaning action will not be complete. Although one embodiment of the filter shown in the aforementioned patent (FIGS. 10 to 12) limits the total movement of each plate permitted during cleaning by use of a tapered center support tube and plates with central openings which are of successively decreased size, it provides no means to insure a uniform and predetermined spacing will actually occur between all plates.

The filter relies upon the axial force exerted on the plates by the flushing fluid impinging on the chamfered plate edges to cause separation of the plates. Of course, if adjacent plates adhere together due to corrosion, the adhesive nature of the lodged matter or for any other reason by more than the upward force exerted by the fluid, the plates will not separate at all. The same result occurs if one of the plates adheres to the center support tube since it will prevent all plates below it from separating. Even if separation occurs between some plates, the force of the fluid flow may not be sufficient to separate the plates to the maximum limit and thorough cleaning may not be achieved.

Similar results will occur if the force of the fluid flow is not uniform about the edges of a plate and the plate becomes misaligned on the support tube while being moved. In such a case the spacing between a pair of adjacent plates will not be uniform at all points around their perimeter, and at some points the plates may not be separated sufficiently to allow proper cleaning. Further, to the extent the filter does facilitate increasing the spacing between the plates during cleaning, the filter requires an otherwise unnecessary and flow restricting tapered support tube, and plates with central opening of successively smaller size and fluid carrying ability. The complexity of the filter parts and its assembly are also distinct disadvantages of this type of filter.

Another embodiment of the filter shown in said patent (FIGS. 7 to 9) utilizes "spring discs" to cause initial separation of adjacent discs or plates; however, as in the other embodiment, no means are provided to insure that all plates will be separated by a uniform and predetermined amount as is necessary for thorough cleaning of the filter. Even if initial separation occurs as a result of the spring action, two or more adjacent plates may not further separate and the cleaning action of the reverse flush is inhibited. Additional disadvantages of this type of filter are the difficulty of its manufacture and of selecting a suitable material for the plates which has sufficient resiliency to function as a spring. Another disadvantage is the unsuitability of this plate design for manufacture out of an inexpensive plastic material.

It will therefore be appreciated that there has been a need for a disc-type filter which insures a uniform and predetermined spacing will occur between adjacent plates during cleaning by reverse flushing. Ideally, such a filter should have plates with enlarged and uniform central openings, and have a design which is simple, inexpensive to manufacture, and easy to assemble. The present invention fulfills this need, and further provides other related advantages.

SUMMARY OF THE INVENTION

The present invention resides in a disc-type filter having a stack of filter plates which may be separated by a predetermined and uniform distance when moved apart for cleaning, and having a construction which provides for improved filtering, reverse flushing and operating characteristics. Basically, and in general terms, the filter of the invention includes a filter housing with two flow ports, a stack of slightly spaced apart and axially moveable annular filter plates contained therein which have uniform central openings and are interconnected by a plurality retainers, and control means for selectively holding the plates in a spaced apart arrangement for filtration and moving the plates apart for cleaning.

More specifically, in the presently preferred embodiment of the invention, the filter plates each have a flange located along their central opening, a projection extending toward an adjacent plate to define a filtration gap, and clearance apertures to avoid interference with the retainers. Embossments hold the plates in their spaced apart position for filtration. The retainers are rivets, and are slidably disposed in cooperating openings in pairs of adjacent plates. The cooperating openings and clearance apertures are positioned uniformly and symmetrically about the filter plates to allow a plate to be used in any position in the stack. Guide bars slidable engage the stack of plates along the periphery of the plates. The plates are stacked vertically above the input flow port, with the central openings in the plates in axial alignment with the port.

Other features and advantages of the invention will become apparent from the following detailed description, taken in conjunction with the accompanying drawings.

DETAILED DESCRIPTION

Figures 1, 2, 3:
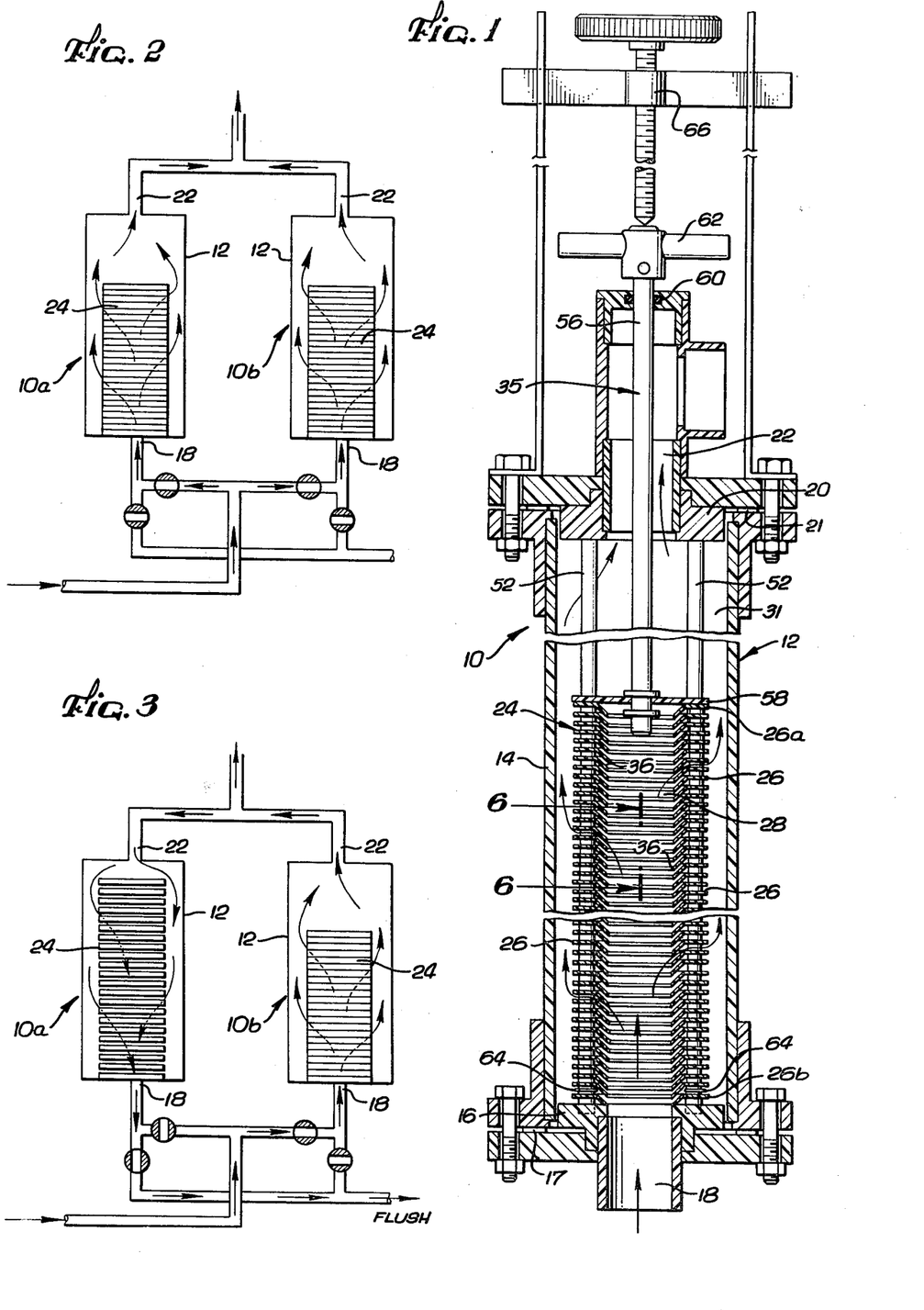
FIG. 1 is a sectional view of a filter embodying the present invention.
FIG. 2 is a schematic view of an assembly of two filters of the present invention, showing both filters operating in the filtration mode.
FIG. 3 is a schematic view of the filter assembly shown in FIG. 2, showing one filter operating in the reverse flush mode.

As shown in the drawings for purposes of illustration, the present invention is embodied in a filter, indicated generally by reference numeral 10, of the disc-type. The filter 10 includes a filter housing 12 having a cylindrical sidewall 14 flanged at both of its ends. The sidewall 14 is closed at its lower end by a first end cap assembly 16 having a first flow port 18 therethrough, and is closed at its upper end by a second end cap assembly 20 having a second flow port 22 therethrough. A gasket 17 provides a fluid tight seal between the first end cap assembly 16 and the sidewall 14, and another gasket 21 provides a fluid tight seal between the second end cap assembly 20 and the sidewall. The first and second flow ports 18 and 22 provide the fluid passages into and out of the interior of the filter housing 12. Fluid to be filtered flows into the first flow port 18, and the filtered fluid flows out of the second flow port 22.

Positioned within the filter housing 12, in the path of fluid flow between the first and second flow ports 18 and 22, is a stack of substantially parallel filter plates 24. The stack of plates 24 is comprised of a plurality of annular filter plates 26 each having a central opening 28 and being in substantial axial alignment with one another. The central openings 28 of the plates are in fluid communication with one another and communicate with the first flow port 18.

The plates 26 are held slightly spaced apart from each other, and provide a filter space 30 therebetween for fluid communication between the central opening 28 and the interior space 31 of the filter housing 12 external to the plates. The second flow port 22 communicates with the interior space 31. As fluid flows from the first flow port 18 to the second flow port 22, it passes through the spaces 30 between the plates 26, and particulate matter 32 in the fluid which is of sufficiently large size relative to the spaces, is trapped by the plates. As used herein, particulate matter includes particles as well as debris and foreign matter of other shapes.

As the spaces 30 become clogged with particulate matter 32, the flow of fluid through the filter 1 is inhibited, and it becomes necessary to clean the filter. Cleaning is accomplished by reversing the flow of fluid so that it flows from the second flow port 22 to the first flow port 18, thereby flushing the trapped matter out of and away from the spaces 30, and free of the plates 26.

In accordance with the invention, to facilitate thorough cleaning of the filter 10, the filter plates 26 are axially moveable to permit selective enlargement of the spaces 30, and are interconnected by retainers 34 and under the positive force of a control mechanism 35 which operate together to provide a predetermined and uniform spacing between adjacent plates when moved apart for cleaning. In accordance with another aspect of the invention, the plates 26 have substantially uniform central openings 28 for uniform and improved fluid flow, and have flanges 36 for diversion of the fluid flow to improve clearage of particulate matter 32 during cleaning and for providing a pre-filtering of the fluid before it passing through the spaces 30 during filtering.

Figure 4:
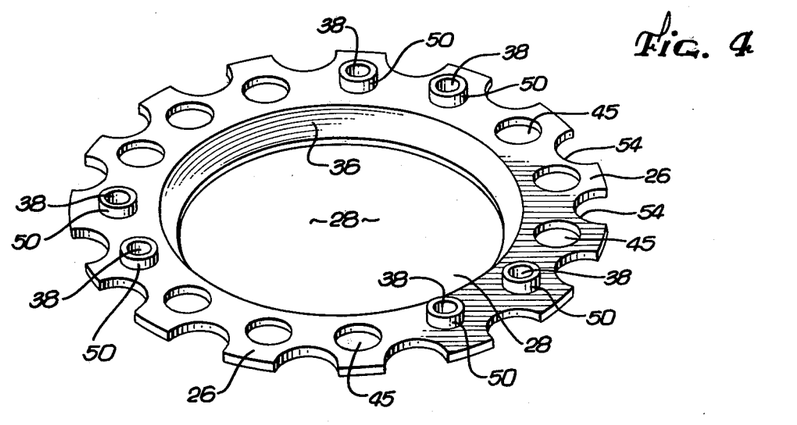
FIG. 4 is an enlarged, perspective view of a filter plate used in the filter shown in FIG. 1.

More specifically, the retainers 34 interconnecting the filter plates 26 are two-headed rivets slidably disposed in cooperating openings 38 in the plates. Each retainer or rivet 34 slidably engages a pair of adjacent plates 26 and limits the separation of the pair of plates when moved apart for cleaning. In the presently preferred embodiment of the invention, pairs of plates 26 are interconnected by three retainers 34 disposed in three cooperating openings 38 positioned symmetrically about each plate, and intermediate of the central opening 28 and the periphery of the plate. This arrangement eliminates the need for a plate support tube to control plate spacing, and allows use of a filter plate with a large central opening relative to the diameter of the plate.

Figure 5:
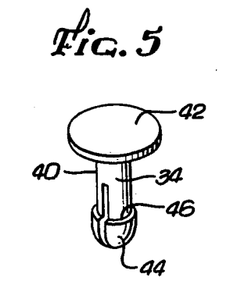
FIG. 5 is an enlarged, perspective view of a rivet used in the filter shown in FIG. 1.
Figure 7:
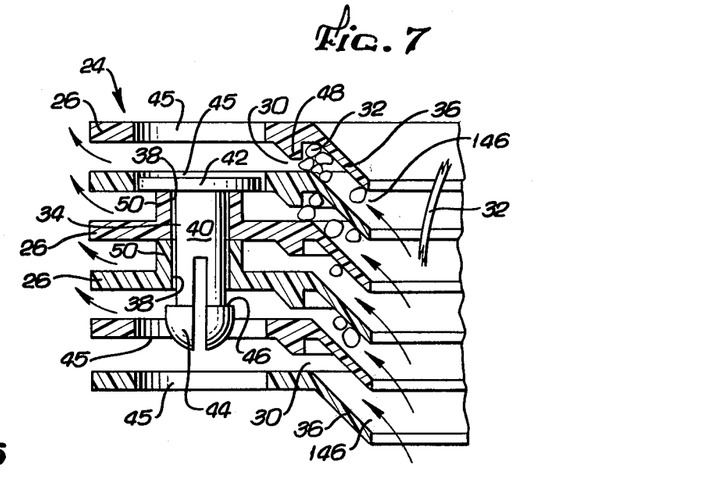
FIG. 7 is an enlarged, fragmentary view of a filter shown in FIG. 1, showing the filter plates in the filtration mode.

As shown in FIG. 5, the retainers 34 each include a shaft 40 having at one end a flat, round head 42 and at the other end a tapered head 44. As shown in FIG. 7, the cooperating openings 38 are sized to slidably receive the shaft 40 of the retainers 34, and the flat and tapered heads 42 and 44, respectively, are sized to engage the plates 26 and prevent the passing of the heads through the openings during operation of the filter 10. The tapered head 44 is formed with an enlarged shoulder 46 adjacent to the shaft 40 for engaging the plate, and tapers in size in the direction away from the shaft to facilitate insertion of the tapered head into the opening 38 during assembly. The tapered head 44 and a portion of the shaft 40 adjacent to the tapered head are split in half and fabricated from a resilient material which allows the split portions of the retainer 34 to be pressed together for easy insertion and resume their normal shape for operation.

Because the length of the retainer 34 exceeds the distance between the plates 26 stacked immediately above and below the pair of adjacent plates being engaged by the retainer, especially when the plates are moved together for filtration, clearance apertures 45 are provided in the surrounding plates to prevent interference of the retainers with the plates. The apertures 45 are positioned in each plate 26 at least immediately above and below each pair of cooperating openings 38 containing a retainer 34, and the apertures are sized to avoid contact of the retainer heads 42 and 44 with the plates.

For ease of manufacture and assembly of the stack of plates 24, and thereby reduction of the expense involved with both, the plates 26 are of identical construction with the cooperating openings 38 and clearance apertures 45 uniformly and symmetrically distributed around the plate. In the presently preferred embodiment of the invention, each plate 26 has three pairs of cooperating openings 38 and three apertures 45 positioned between each pair of cooperating openings.

Figure 8:
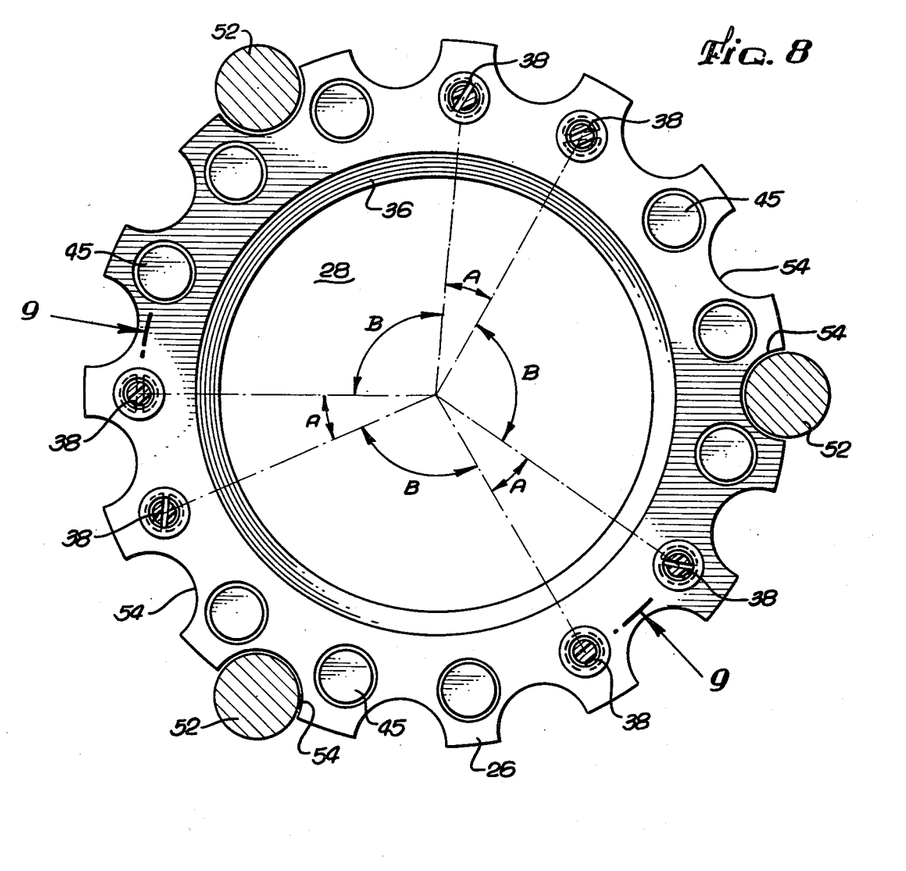
FIG. 8 is a sectional view taken substantially along the line 8—8 of FIG. 6.

As shown in FIG. 8, the two cooperating openings 38 comprising each of the three pairs of cooperating openings have a substantially equal angular spacing A from each other, and the angular spacing B between each successive pair of the three pairs of openings is an integral multiple of the angular spacing A. Further, each of the apertures 45 in a plate 26 is angularly spaced from each immediately adjacent aperture and from each immediately adjacent cooperating opening 38 by the angular spacing A. When the angular spacing B is an integral multiple greater than one of the angular spacing A, at least one aperature 45 can be positioned between the pairs of cooperating openings 38 to provide clearance for the retainers 34. While the embodiment of the invention shown in the drawings has only three pairs of cooperating openings, the angular relationship described herein will provide the same advantages when used for a plate with more than three pairs of cooperating openings.

In the embodiment shown in FIG. 8 of the drawings, the angular spacing A is approximately 24 degrees, and the angular spacing B is about four times A, or 96 degrees. With such an arrangement, each plate can be used in any position in the stack of plates and the need to manufacture plates with different construction for use in one filter is eliminated.

Figure 9:
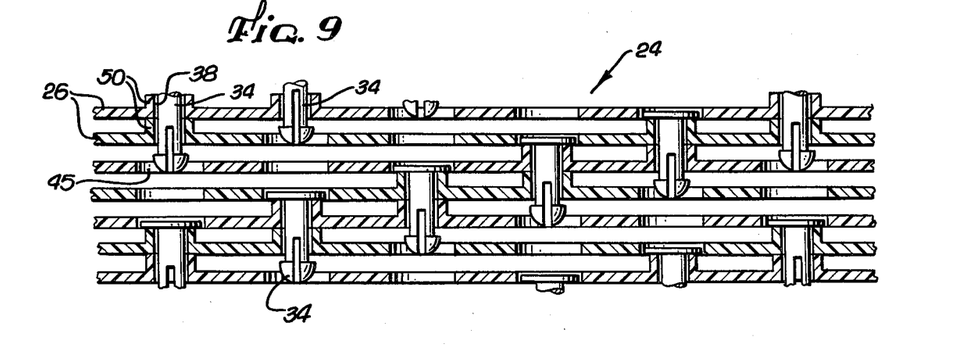
FIG. 9 is a sectional view taken substantially along the line 9—9 of FIG. 8.

When assembling the stack of plates 24, each successive plate 26 in the stack is rotated in the same direction by the angular spacing A from the previous plate, and alternate cooperating openings 38 are utilized to interconnect the plate with the adjacent plate below. The three remaining cooperating openings in the plate 26 are utilized to interconnect the plate with the adjacent plate above. By such rotation of the plates 26 and placement of the cooperating openings 38 and apertures 45, the retainers 34 engaging the successive plates are prevented from interfering with each other during operation of the filter (see FIG. 9). Also, retainers 34 may be used of greater length than otherwise possible and provide for greater separation of the plates for cleaning.

The filter plates 26 each have an annular flange 36 located along and encircling the central opening 28 of the plate. The flanges 36 extend generally toward the first flow port 18 and serve to divert the fluid flow and particulate matter 32 contained therein away from the plates and toward the first flow port during reverse flushing. Thereby the fluid force from one portion of the plate stack 24 is prevented from depositing the particulate matter 32 it carries on an opposite portion of the plate stack across the central opening 28.

The flanges 36 are of substantially uniform angular orientation relative to the plates 26, and when the plates are positioned for filtration, a space 146 is provided between the flanges of adjacent plates which serves as a pre-filter. The space 146 catches large particulate matter 32 in the fluid flow and keeps it clear of the smaller filter spaces 30 between the plates 26.

The smallest size of particulate matter 32 which the filter 10 will trap is determined by the size of the filter spaces 30 between the plates 26 when in position for filtration, and in the presently preferred embodiment of the invention, the filter spaces are defined by annular projections 48 on the plates 26. The annular projection 48 on each plate 26 is located adjacent to the plate's flange 38 and fully encircles the central opening 28. The projection 48 extends toward the immediately adjacent plate, and the gap between the projection and the adjacent plate forms the filter space 30. In such manner, the particulate matter 32 trapped by the plates 26 is kept near the central openings 28 and not permitted to lodge deeply between the plates where it would be more difficult to remove during reverse flushing.

To maintain a desired spacing between adjacent plates 26 in the stack of plates 24 during filtration, embossments 50 are provided on the plates and encircle the cooperating opening 38 in the plates. The embossments 50 on each plate 26 extend toward the adjacent plate and hold the plates separated. As previously discussed, the filter spaces 30 formed by the annular projections 48 determined the size of particulate matter 32 which the plates 26 will trap, and the embossments 50 allow the plates to be otherwise spaced sufficiently far apart to provide an unrestricted fluid flow between the plates and prevent clogging by particulate matter which may not be trapped by the filter spaces.

Figure 6:
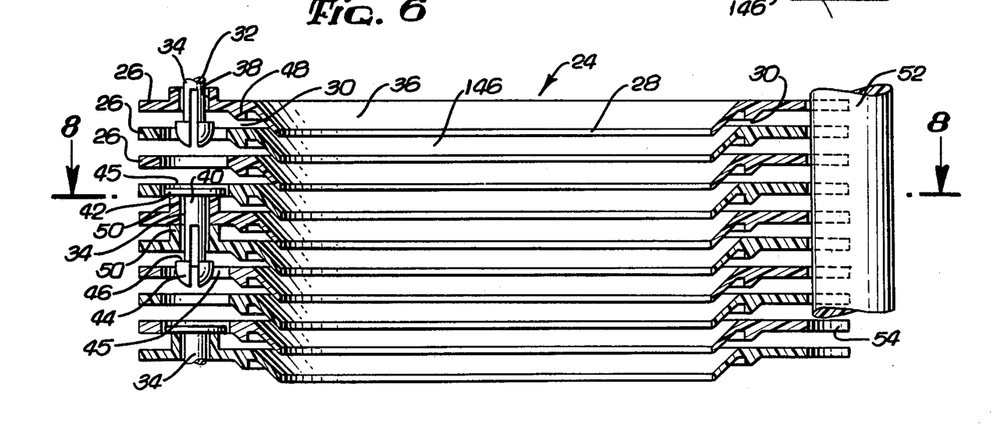
FIG. 6 is an enlarged, sectional view taken substantially along the line 6—6 of FIG. 1.

The axial alignment of the stack of plates 24 is maintained by a plurality of guide bars 52 positioned around the stack. Each of the plates 26 has arcuate cuts 54 formed along its periphery which are sized and spaced to slidably engage the guide bars 52. The guide bars 52 extend from the first end cap assembly 16 to the second end cap assembly 20, and are rigidly connected thereto. In the presently preferred embodiment of the invention, three guide bars 52 are symmetrically positioned about the stack of plates 24, and each plate 26 is provided with cuts 54 for engaging the bars extending uniformly about its periphery so that each plate can be used in any position in the stack of plates.

Also in the preferred embodiment of the invention, the plates 26 are vertically stacked immediately above the first flow port 18 with the guide bars 52 holding the central openings 28 of the plates in axial alignment with the first flow port. This arrangement promotes thorough removal of trapped particulate matter 32 from the housing 12 during reverse flushing. During filtration the fluid carrying the particulate matter 32 enters the filter housing 12 through the first flow port 18 and the particulate matter is trapped by the prefilter and filter spaces 146 and 30, respectively, located adjacent to the central openings 28 of the plates 26 (see FIG. 7). The filtered fluid flows out the second flow port 22.

Figure 10:
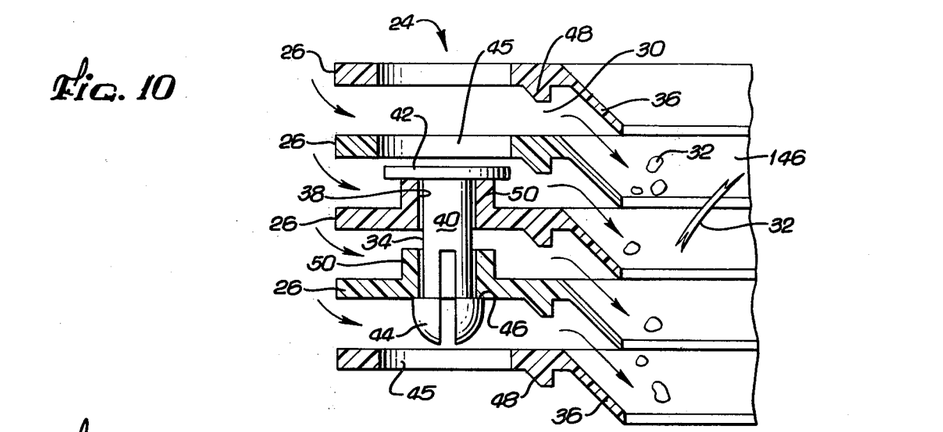
FIG. 10 is an enlarged, fragmentary view of the filter shown in FIG. 1, showing the filter plates in the reverse flush mode.

During reverse flushing, clean fluid under pressure is forced into the filter housing 12 through the second flow port 22 and flushes the trapped matter out of and away from the spaces 30 and 146, and directly into the central openings 28 (see FIG. 10). The flow of the fluid and gravity carries the freed particulate matter 32 through the first flow port 18 where it may then be exhausted to the atmosphere or into a suitable container (not shown). No particulate matter 32 enters the interior space 31 of the filter housing as in some disc-type filters, where it could accumulate on the horizontal surfaces of the housing and then again be trapped by the filter during filtration, reducing the efficiency of the filter.

The control mechanism 35 which permits selective enlargement of the spaces 30 between the plates 26 for reverse flushing, and return of the plates into their position for filtration, comprises an actuator rod 56 attached at one end to a solid end plate 58 which is in turn rigidly connected to the last annular filter plate 26a in the stack of plates 24. The actuator rod 56 extends through the second end cap assembly 20 and beyond the filter housing 12. A conventional O-ring 60 maintains a fluid tight seal between the rod 56 and the end cap assembly 20. The rod 56 has attached at its end external to the filter housing 12 a handle 62 used to manually control the operation of the filter 10.

When an outwardly directed force is applied to the actuator rod 56, the rod acts together with the retainers 34 interconnecting the plates 26 to cause the plates to axially separate by a predetermining and uniform distance, and holds the plates in that position during reverse flushing. The full desired separation is achieved by anchoring the first annular filter plate 26b in the stack in its position adjacent to the first flow port 18. Stops 64 rigidly attached to the guide bars 52 immediately adjacent to the first plate 26b inhibit movement of the plate.

When an inwardly directed force is applied to the actuator rod 56, the rod causes the plates 26 to return to their filtration position and holds the plates in compressive engagement in that position. A block and screw apparatus 66 mounted on the second end cap assembly 20 and above the handle 62 of the actuator rod 56 assists in applying the force to the handle necessary to hold the plates 26 in compressive engagement. The apparatus 66 may be calibrated to show the inward travel of the rod 56 necessary to properly seat all plates in the filtration mode, thereby insuring proper functioning of the filter and providing a means to detect a malfunction such as might result from a deposit of particulate matter adhering to a plate and preventing its proper seating and spacing from the next plate. It is to be realized that although a manually operated filter is described and shown herein, the rod 56 may be operated by conventional electric or hydraulic motors, or by any other convenient means.

A system using a pair of filters 10a and 10b of the present invention interconnected to permit dual filtration is shown in FIG. 2. The same filters are shown in FIG. 3 with the filtered fluid of filter 10b being used to flush the filter 10a without the need for clean fluid from an external source. The arrows indicate the general direction of fluid flow in the system.

Figure 11:
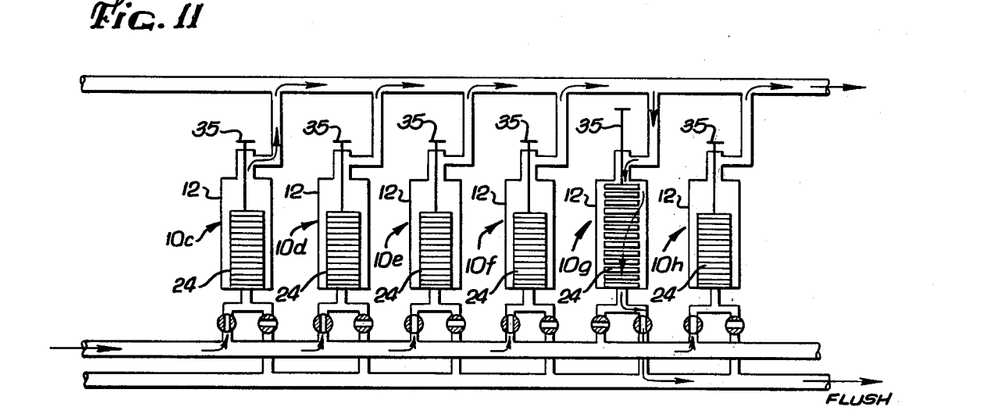
FIG. 11 is a schematic view of an assembly of six filters of the present invention, showing one filter operating in the reverse flush mode and the remainder in the filtration mode.
Figure 12:
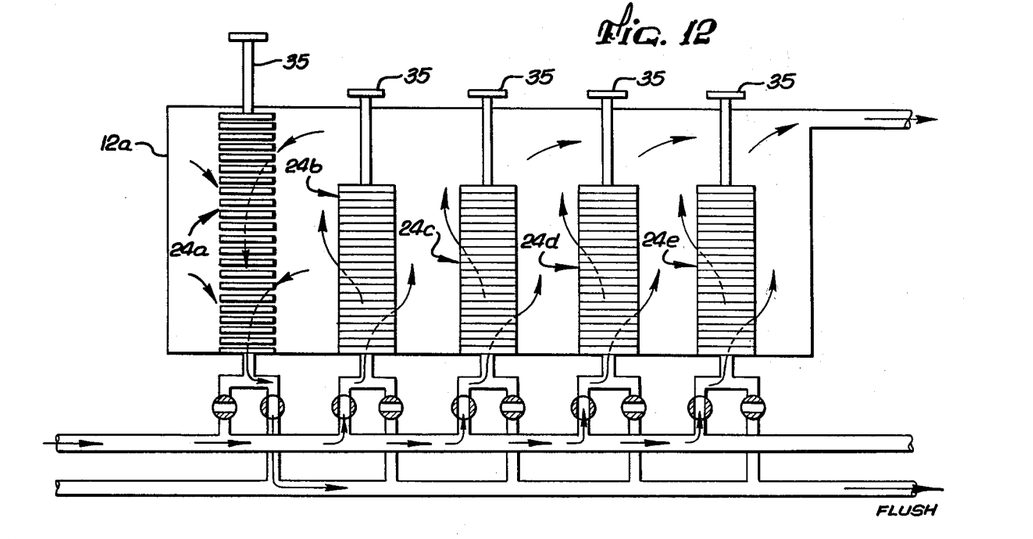
FIG. 12 is a schematic view of an assembly of five filters operating in a single housing, showing one filter operating in the reverse flush mode and the remainder in the filtration mode.

Another system using a bank of six filters 10c-h interconnected to permit a continuous filtration action by five of the filters even while the sixth filter 10g is being flushed using some of the filtered fluid from the other filters is shown in FIG. 11. Yet another system is shown in FIG. 12, however, in this system five stacks of plates 24a-e are contained within a single housing 12a. Each of the five stacks of plates 24a-e is individually operable, and one or more may be reverse flushed at any time by maintaining a positive pressure of filtered fluid in the housing 12a. The pressure prevents any particulate matter 32 from entering the housing 12a when the plates 26 of one stack are spaced for flushing, and is provided by the pressure from the remainder of the stacks operating in the filtration mode and the static fluid pressure of the fluid in the housing.

It will be appreciated from the foregoing description that the present invention represents a significant advance in the field of disc-type filters. In particular, it provides an inexpensive filter which may be manufactured from suitable plastic material, and a filter which insures a predetermined and uniform spacing between the filter plates when moved apart for cleaning. It further provides a filter having substantially improved filtering, reverse flushing and operating characteristics. It will also be appreciated that, although a specific embodiment of the invention has been described herein for purposes of illustration, various modifications may be made without departing from the spirit and scope of the invention. Accordingly, the invention is not to be limited except as by the appended claims.

I claim:

1. A filter for use in the filtration of fluids, comprising:
    a filter housing, said housing having first and second flow ports;
    a plurality of stacked substantially parallel filter plates positioned within said housing in the path of fluid flow between said first and second ports, said plates being spaced apart to provide fluid communicating passages therebetween for filtration, and said plates being moveable to increase said spacing for cleaning of said passages;
    means interconnecting said plates for providing a predetermined and limited spacing between each adjacent pair of plates in the stack when said plates are moved apart for cleaning; and
    at least one control member for selectively moving said interconnected plates apart for cleaning.

2. The filter of claim 1, wherein each said plate has a substantially uniform central opening, said openings being in fluid communication with one another and communicating with said first flow port.

3. The filter of claim 1 or 2, wherein said means interconnecting said plates includes a plurality of retainers, each said retainer slidably engaging a pair of adjacent plates and limiting separation of said pair of plates when moved apart for cleaning.

4. The filter of claim 1, wherein said means interconnecting said plates includes retainers slidably disposed in cooperating openings in said plates, each said retainer retaining a pair of adjacent plates to limit separation of said pair of adjacent plates when moved apart for cleaning.

5. The filter of claim 4, wherein said retainers are two-headed rivets.

6. The filter of claim 4, wherein at least one said plate stacked adjacent said pair of plates has a clearance aperture therein positioned to prevent interference of said adjacent plate with said retainer when said pair of plates are moved together for filtration.

7. The filter of claim 4, wherein at least three pairs of said cooperating openings are positioned symmetrically about each said plate in said pair of plates, and said pair of plates is retained by at least three said retainers.

8. The filter of claim 7, wherein the angular spacing between said cooperating openings of each of said pairs of cooperating openings is substantially equal, and the angular spacing between each successive pair of said pairs of cooperating opening is an integral multiple greater than one of the angular spacing between said cooperating openings of said pairs.

9. The filter of claim 1, wherein said control member includes a selectively operable actuator rod connected to at least one of said plates.

10. The filter of claim 2, wherein at least two said adjacent plates each have a flange located along said central opening, said flanges extending generally toward said first flow port and providing pre-filtering of the fluid flow through said passages during filtration and diversion of the fluid flow generally toward said first port during cleaning.

11. The filter of claim 2, wherein substantially each said plate has at least one projection extending toward an adjacent plate to define a filtration gap between said projection and said adjacent plate, said projection being located adjacent said central opening.

12. The filter of claim 2, wherein said filter includes guide means external to said central openings to maintain the relative alignment of said plates.

13. The filter of claim 12, wherein said guide means includes a plurality of guide bars, and substantially each said plate has means adjacent to its periphery for slidably engaging said bars.

14. The filter of claim 2, wherein said plates are stacked vertically above said first flow port, with said central openings and said first port in substantial axial alignment.

15. A filter for use in the filtration of fluids, comprising:
a filter housing, said housing having first and second flow ports;
a plurality of stacked substantially parallel filter plates positioned within said housing in the path of fluid flow between said first and second ports, said plates being spaced apart to provide fluid communicating passages therebetween for filtration, and said plates being moveable to increase said spacing for cleaning of said passages;
control means for selectively holding said plates in said spaced apart arrangement for filtration, and moving said plates apart for cleaning; and
a plurality of retainers interconnecting said plates for providing a predetermined and limited spacing between each adjacent pair of plates in the stack when said plates are moved apart for cleaning.

16. The filter of claim 15, wherein each said plate has a substantially uniform central opening, said openings being a fluid communication with one another and communicating with said first flow port.

17. The filter of claim 15 or 16, wherein each of said retainers slidably engages a pair of adjacent plates and limits separation of said pair of plates when moved apart for cleaning.

18. The filter of claim 15, wherein said retainers includes two-headed rivets slidably disposed in cooperating openings in said plates, each said rivets retaining a pair of adjacent plates to limit separation of said pair of plates when moved apart for cleaning.

19. The filter of claim 18, wherein at least one said plate stacked adjacent said pair of plates has a clearance aperture therein positioned to prevent interference of said adjacent plate with said rivet when said pair of plates are moved together for filtration.

20. The filter of claim 18, wherein at least three pairs of said cooperating openings are positioned symmetrically about each said plate in said pair of plates, and said pair of plates is retained by at least three said rivets.

21. The filter of claim 20, wherein the angular spacing between said cooperating openings of each of said pairs of cooperating openings is substantially equal, and the angular spacing between each successive pair of said pairs of cooperating openings is an integral multiple greater than one of the angular spacing between said cooperating openings of said pairs.

22. The filter of claim 18, wherein said plates are held spaced apart during filtration by embossments substantially encircling a plurality of said cooperating opening in said pair of adjacent plates and providing a predetermined spacing therebetween.

23. The filter of claim 15, wherein said control means includes an actuator rod attached to at least one of said plates.

24. The filter of claim 16, wherein at least two said adjacent plates have an annular flange located along said central opening, said flanges extending generally toward said first flow port and providing pre-filtering of the fluid flow through said passages during filtration and diversion of the fluid flow generally toward said first port during cleaning.

25. The filter of claim 24, wherein substantially each said plate has at least one annular projection extending toward an adjacent plate to define a filtration gap between said projection and said adjacent plate, said projection being located adjacent said central opening.

26. The filter of claim 16, wherein said filter includes guide means external to said central openings to maintain the relative alignment of said plates.

27. The filter of claim 26, wherein said guide means includes a plurality of guide bars, and substantially each said plate has means adjacent to its periphery for slidably engaging said bars.

28. The filter of claim 16, wherein said plates are stacked vertically above said first flow port, with said central openings and said first port in substantial axial alignment.

29. A filter for use in the filtration of fluids, comprising:
a filter housing, said housing having first and second flow ports;
a plurality of stacked annular filter plates in substantial axial alignment with one another positioned within said housing in the path of fluid flow between said first and second ports, said plates being spaced apart to provide fluid communicating passages therebetween for filtration, being axially moveable to increase said spacing for cleaning of said passages, and each having a substantially uniform central opening, said openings being in fluid communication with one another and communicating with said first port;
control means for selectively holding said plates in said spaced apart arrangement for filtration, and axially moving said plates apart for cleaning; and
a plurality of retainers interconnecting said plates, said retainers being positioned intermediate of said central openings and the periphery of said plates for providing a predetermined and uniform spacing between adjacent plates when moved apart for cleaning.

30. The filter of claim 29, wherein each of said retainers slidably engages a pair of adjacent plates and limits separation of said pair of plates when moved apart for cleaning.

31. The filter of claim 29, wherein substantially each said plate has an annular flange located along and substantially encircling said central opening, said flanges being of substantially uniform angular orientation relative to said plates and extending generally toward said first flow port.

32. The filter of claim 29, wherein substantially each said plate has at least one annular projection extending toward an adjacent plate to define a filtration gap between said projection and said adjacent plate, said projection being located adjacent said central opening.

33. The filter of claim 29, wherein said retainers includes two-headed rivets slidably disposed in cooperating openings in said plates, each said rivet retaining a pair of adjacent plates to limit separation of said pair of plates when moved apart for cleaning.

34. The filter of claim 33, wherein at least one said plate stacked adjacent said pair of plates has a clearance aperture therein positioned to prevent interference of said adjacent plate with said rivet when said pair of plates are moved together for filtration.

35. The filter of claim 33, wherein at least three pairs of said cooperating openings are positioned symmetrically about each said plate in said pair of plates, and said pair of plates is retained by at least three said rivets.

36. The filter of claim 35, wherein in the angular spacing between said cooperating openings of each of said pairs of cooperating openings is substantially equal, and the angular spacing between each successive pair of said pairs of cooperating openings is an integral multiple greater than one of the angular spacing between said cooperating openings of said pairs.

37. The filter of claim 33, wherein said plates are held spaced apart during filtration by embossments substantially encircling a plurality of said cooperating opening in said pair of adjacent plates and providing a predetermined spacing therebetween.

38. The filter of claim 29, wherein said control means includes a manually operable actuator rod attached to at least one of said plates and extending external to said filter housing.

39. The filter of claim 29, wherein said filter includes guide means external to said central openings to maintain the relative alignment of said plates.

40. The filter of claim 39, wherein said guide means includes a plurality of guide bars, and substantially each said plate has means adjacent to its periphery for slidably engaging said bars.

41. The filter of claim 29, wherein said plates are stacked vertically above said first flow port, with said central openings and said first port in substantial axial alignment.

* * * * *